(12) United States Patent
Jee (10) Patent No.: US 11,605,206 B2
(45) Date of Patent: Mar. 14, 2023

(54) METHOD AND APPARATUS WITH HUMAN BODY ESTIMATION

(71) Applicant: SAMSUNG ELECTRONICS CO., LTD., Suwon-si (KR)

(72) Inventor: Seunghoon Jee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/222,322

(22) Filed: Apr. 5, 2021

(65) Prior Publication Data

US 2022/0189123 A1 Jun. 16, 2022

(30) Foreign Application Priority Data

Dec. 11, 2020 (KR) .................. 10-2020-0173133

(51) Int. Cl.
| G06T 19/00 | (2011.01) |
| G06T 7/246 | (2017.01) |
| G06T 7/50 | (2017.01) |
| G06F 3/01 | (2006.01) |
| G06T 19/20 | (2011.01) |

(52) U.S. Cl.
CPC .......... *G06T 19/006* (2013.01); *G06F 3/011* (2013.01); *G06T 7/251* (2017.01); *G06T 7/50* (2017.01); *G06T 19/20* (2013.01); *G06T 2207/30196* (2013.01); *G06T 2219/2016* (2013.01)

(58) Field of Classification Search
CPC ......... G06T 19/006; G06T 7/50; G06T 7/251; G06T 19/20; G06T 2207/30196; G06T 2219/2016; G06F 3/011
See application file for complete search history.

(56) References Cited

U.S. PATENT DOCUMENTS

| 8,311,384 B2 | 11/2012 | Raghoebardajal et al. |
| 9,236,000 B1 | 1/2016 | Worley, III |
| 9,367,928 B2 | 6/2016 | De Almeida Barreto et al. |

(Continued)

FOREIGN PATENT DOCUMENTS

| KR | 10-2014-0097451 A | 8/2014 |
| KR | 10-1553273 B1 | 9/2015 |

(Continued)

OTHER PUBLICATIONS

Redmon, Joseph, et al. "You Only Look Once: Unified, Real-Time Object Detection." Proceedings of the IEEE conference on computer vision and pattern recognition. 2016. (10 pages in English).

(Continued)

*Primary Examiner* — Edward Martello
(74) *Attorney, Agent, or Firm* — NSIP Law (57) ABSTRACT

A human body estimating method includes: receiving an image frame including a two-dimensional (2D) human body from a camera; determining a 2D appearance parameter of the 2D human body by analyzing the image frame; determining a three-dimensional (3D) appearance parameter of the 2D human body based on the 2D appearance parameter, a camera parameter of the camera, a 3D space parameter of the 2D human body; and estimating a 3D human body corresponding to the 2D human body based on the 3D space parameter and the 3D appearance parameter.

22 Claims, 8 Drawing Sheets

(56) References Cited

U.S. PATENT DOCUMENTS

| | | | |
|---|---|---|---|
| 10,388,075 B2 | 8/2019 | Schmirler et al. | |
| 10,395,411 B2 | 8/2019 | Black et al. | |
| 10,571,263 B2* | 2/2020 | Abovitz et al. | |
| 2011/0210915 A1* | 9/2011 | Shotton | G06V 40/103 |
| | | | 345/157 |
| 2013/0042296 A1 | 2/2013 | Hastings et al. | |
| 2018/0293788 A1* | 10/2018 | Black | G06T 17/00 |
| 2019/0325654 A1 | 10/2019 | Stisser et al. | |
| 2020/0126297 A1* | 4/2020 | Tian | A61B 5/389 |
| 2021/0097759 A1* | 4/2021 | Agrawal | G06T 15/80 |

FOREIGN PATENT DOCUMENTS

| | | |
|---|---|---|
| KR | 10-2019-0106900 A | 9/2019 |
| WO | WO 2016/207311 A1 | 12/2016 |

OTHER PUBLICATIONS

Bolya, Daniel, et al. "Yolact: Real-Time Instance Segmentation." Proceedings of the IEEE/CVF International Conference on Computer Vision. 2019. (10 pages in English).

Kanazawa, Angjoo, et al. "End-to-End Recovery of Human Shape and Pose." Proceedings of the IEEE Conference on Computer Vision and Pattern Recognition. 2018. (10 pages in English).

Loper, Matthew, et al. "SMPL: A Skinned Multi-Person Linear Model." ACM transactions on graphics (TOG) 34.6 (2015): 1-16. (4 pages in English).

Pavlakos, Georgios, et al. "Learning to Estimate 3D Human Pose and Shape From a Single Color Image." Proceedings of the IEEE Conference on Computer Vision and Pattern Recognition. 2018. (10 pages in English).

* cited by examiner

METHOD AND APPARATUS WITH HUMAN BODY ESTIMATION

CROSS-REFERENCE TO RELATED APPLICATIONS

This application claims the benefit under 35 USC § 119(a) of Korean Patent Application No. 10-2020-0173133 filed on Dec. 11, 2020, in the Korean Intellectual Property Office, the entire disclosure of which is incorporated herein by reference for all purposes.

BACKGROUND

1. Field

The following description relates a method and apparatus with human body estimation.

2. Description of Related Art

Augmented reality (AR) is a technology that provides a single image by overlapping a virtual object with a real object or a background. The development of AR is increasing the importance of object recognition in the field of computer vision. Human body estimation is a technology that estimates a human body model corresponding to a shape of a person on a screen. Accurate human body estimation enables interaction with a virtual object in a human shape represented through an AR device or a real object. For example, through such an interaction, it is possible to represent a virtual object avoiding or colliding with a corresponding human shape. For human body estimation, existing technologies may, for example, recognize a moving human as a form of a box in an image, or capture an image of a person that does not move through a single camera around the person in various ways and estimate its three-dimensional (3D) shape.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a human body estimating method includes: receiving an image frame including a two-dimensional (2D) human body from a camera; determining a 2D appearance parameter of the 2D human body by analyzing the image frame; determining a three-dimensional (3D) appearance parameter of the 2D human body based on the 2D appearance parameter, a camera parameter of the camera, a 3D space parameter of the 2D human body; and estimating a 3D human body corresponding to the 2D human body based on the 3D space parameter and the 3D appearance parameter.

The 2D appearance parameter may include a 2D joint parameter and a 2D silhouette parameter.

The 3D space parameter may include either one or both of a rotation parameter and a translation parameter that represents a relative relationship between the camera and the 2D human body.

The 3D space parameter is determined based on first simultaneous localization and mapping (SLAM) information of a first augmented reality (AR) device corresponding to the camera and on second SLAM information of a second AR device corresponding to the 2D human body.

The 3D space parameter may be determined based on inertia information of an augmented reality (AR) device corresponding to the camera and position information of a person corresponding to the 2D human body, and the position information of the person may be determined based on a contact point between the person and a plane supporting the person.

The estimating of the 3D appearance parameter may include: determining a temporary 2D appearance parameter based on a candidate 3D appearance parameter, the camera parameter, and the 3D space parameter; and determining the candidate 3D appearance parameter to be the 3D appearance parameter based on a difference between the temporary 2D appearance parameter and the 2D appearance parameter.

The candidate 3D appearance parameter may include a candidate 3D joint parameter and a candidate 3D shape parameter, and the determining of the temporary 2D appearance parameter may include: determining a 2D joint parameter from a 3D joint corresponding to the candidate 3D joint parameter based on the camera parameter, the 3D space parameter, and a projection function; determining a 2D silhouette parameter from a 3D appearance corresponding to the candidate 3D joint parameter and the candidate 3D shape parameter based on the camera parameter, the 3D space parameter, and the projection function; and determining the temporary 2D appearance parameter based on the 2D joint parameter and the 2D silhouette parameter.

The 3D appearance parameter may include a 3D joint parameter and a 3D shape parameter.

The determining of the 3D appearance parameter may include: determining a current average value based on a previous average value of 3D shape parameters of previous image frames and a 3D shape parameter of the image frame; and determining the current average value to be the 3D shape parameter.

The determining of the 2D appearance parameter may include: analyzing the image frame using a pre-trained convolutional neural network (CNN).

The estimating of the 3D human body may include: applying the 3D appearance parameter to a skinned multi-person linear (SMPL) model.

A non-transitory computer-readable storage medium may store instructions that, when executed by a processor, configure the processor to perform the method.

In another general aspect, a human body estimating apparatus includes: a processor configured to: receive an image frame including a two-dimensional (2D) human body from a camera; determine a 2D appearance parameter of the 2D human body by analyzing the image frame; determine a three-dimensional (3D) appearance parameter of the 2D human body based on the 2D appearance parameter, a camera parameter of the camera, and a 3D space parameter of the 2D human body; and estimate a 3D human body corresponding to the 2D human body based on the 3D space parameter and the 3D appearance parameter.

The 2D appearance parameter may include a 2D joint parameter and a 2D silhouette parameter, the 3D space parameter may include either one or both of a rotation parameter and a translation parameter that represents a relative relationship between the camera and the 2D human body, and the 3D appearance parameter may include a 3D joint parameter and a 3D shape parameter.

For the estimating of the 3D appearance, the processor may be configured to: determine a temporary 2D appearance parameter based on a candidate 3D appearance parameter, the camera parameter, and the 3D space parameter; and determine the candidate 3D appearance parameter to be the 3D appearance parameter based on a difference between the temporary 2D appearance parameter and the 2D appearance parameter.

The 3D appearance parameter may include a 3D joint parameter and a 3D shape parameter, and for the determining of the 3D appearance parameter, the processor may be configured to: determine a current average value based on a previous average value of 3D shape parameters of previous image frames and a 3D shape parameter of the image frame; and determine the current average value to be the 3D shape parameter.

The apparatus may include a memory storing instructions that, when executed by the processor, configure the processor to perform the receiving of the image frame, the determining of the 2D appearance parameter, the determining of the 3D appearance parameter, and the estimating of the 3D human body.

In another general aspect, an electronic apparatus includes: a camera configured to generate an image frame including a two-dimensional (2D) human body; and a processor configured to: determine a 2D appearance parameter of the 2D human body by analyzing the image frame; determine a three-dimensional (3D) appearance parameter of the 2D human body based on the 2D appearance parameter, a camera parameter of the camera, and a 3D space parameter of the 2D human body; and estimate a 3D human body corresponding to the 2D human body based on the 3D space parameter and the 3D appearance parameter.

The 2D appearance parameter may include a 2D joint parameter and a 2D silhouette parameter, the 3D space parameter may include either one or both of a rotation parameter and a translation parameter that represents a relative relationship between the camera and the 2D human body, and the 3D appearance parameter may include a 3D joint parameter and a 3D shape parameter.

For the estimating of the 3D appearance, the processor may be configured to: determine a temporary 2D appearance parameter based on a candidate 3D appearance parameter, the camera parameter, and the 3D space parameter; and determine the candidate 3D appearance parameter to be the 3D appearance parameter based on a difference between the temporary 2D appearance parameter and the 2D appearance parameter.

The 3D appearance parameter may include a 3D joint parameter and a 3D shape parameter, and for the determining of the 3D appearance parameter, the processor may be configured to: determine a current average value based on a previous average value of 3D shape parameters of previous image frames and a 3D shape parameter of the image frame; and determine the current average value to be the 3D shape parameter.

In another general aspect, a human body estimating method includes: determining a two-dimensional (2D) appearance parameter based on an image frame including a 2D body received from a camera; determining temporary 2D appearance parameters based on respectively corresponding candidate three-dimensional (3D) appearance parameters; determining a minimum difference among differences between the temporary 2D appearance parameters and the 2D appearance parameter; determining, as a final 3D appearance parameter, one of the candidate 3D appearance used to determine one of the temporary 2D appearance parameters corresponding to the minimum difference; and estimating a 3D body corresponding to the 2D body based on the final 3D appearance parameter.

The determining of the temporary 2D appearance parameters may include: rotating the candidate 3D appearance parameters based on a 3D space parameter; projecting results of the rotating based on a projection function; and translating results of the projecting based on the 3D space parameter.

The 3D space parameter may include: a rotation parameter determined based on inertia information of a device including the camera; and a translation parameter determined based on a difference between a position of the device and a position of the 2D body.

The method may include outputting an output image including an overlap of the 3D body onto the image frame.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components according to example embodiments. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 1:
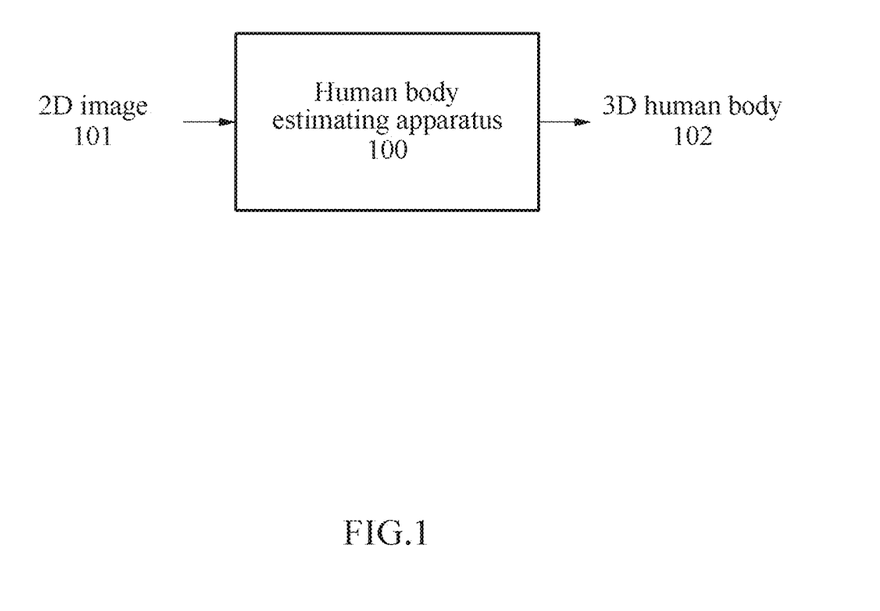
FIG. 1 illustrates an example of an overall operation of a human body estimating apparatus.

FIG. 1 illustrates an example of an overall operation of a human body estimating apparatus. Referring to FIG. 1, a two-dimensional (2D) image 101 may be input to a human body estimating apparatus 100. The 2D image 101 may be a monocular image captured by a single camera. Alternatively, the 2D image 101 may be a still image with a single frame or a video with a plurality of frames. The 2D image 101 may include a 2D human body as an object. For example, in a case in which the 2D image 101 is a video, a plurality of frames of the video may include a moving human body as an object.

The human body estimating apparatus 100 may then estimate a three-dimensional (3D) human body 102 corresponding to the 2D human body appearing in the 2D image 101, based on the 2D image 101. As a result of the estimating, the human body estimating apparatus 100 may output information (e.g., a model parameter) associated with the 3D human body 102, or output an output image including the 3D human body 102. For example, the output image may be a composite image that is represented by overlapping the 3D human body 102 onto the 2D image 101. The human body estimating apparatus 100 may estimate a single 3D human body for a single 2D image. That is, the human body estimating apparatus 100 of one or more embodiments may estimate a single 3D human body by processing the single 2D image without necessarily processing a plurality of 2D images, and the single 2D image and the single 3D human body may be mapped one to one. For example, in a case in which the 2D image 101 is a video, the human body estimating apparatus 100 may sequentially estimate a 3D human body corresponding to a 2D human body in each frame of the video.

In an example, the 3D human body 102 may be used for an interaction of an object represented in an AR image. For example, an image of a real person may be captured through a camera of an AR device (e.g., a camera of the human body estimating apparatus 100), and a 2D image (e.g., the 2D image 101) may then be generated. In this example, the human body estimating apparatus 100 may estimate the 3D human body 102 corresponding to the 2D human body in the 2D image 101. The AR device may verify accurate information of the real person through the 3D human body 102, and represent an interaction between the real person and an AR virtual object. For example, even in a case in which a person is standing with a profile face being shown, the AR device may represent as if a virtual object passes through between the legs of the person. In this example, when the 3D human body 102 is not estimated by a typical AR device, the typical AR device may not be aware (or may not determine) that there is a space between the legs of the person, and may thus be unable to represent as such. In this example, in contrast, when the 3D human body 102 is estimated by the human body estimating apparatus 100 of one or more embodiments, the human body estimating apparatus 100 may be aware (or may determine) that there is a space between the legs of the person, and may thus be able to represent as such. In addition, through the 3D human body 102, the human body estimating apparatus 100 of one or more embodiments may accurately estimate a distance between the AR device and the person, a position of the person, an angle of the person, a form or shape of the person, and the like. Through a result of such accurate estimation, the human body estimating apparatus 100 of one or more embodiments may realistically represent various interaction effects.

Figure 2:
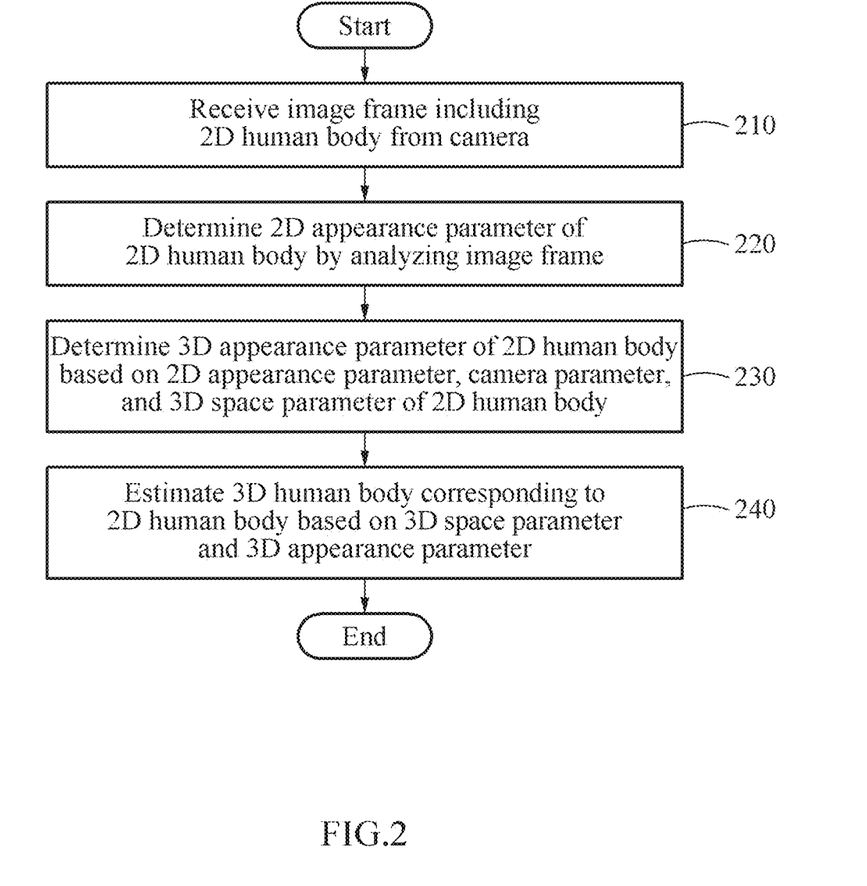
FIG. 2 illustrates an example of a human body estimating method.

FIG. 2 illustrates an example of a human body estimating method. Referring to FIG. 2, in operation 210, a human body estimating apparatus may receive an image frame including a 2D human body from a camera (e.g., a camera of the human body estimating apparatus). The camera may be a monocular camera and the image frame may be a monocular image, as a non-limiting example. For example, in a case in which the input 2D image is a still image, the image frame may be the image. For another example, in a case in which the input 2D image is a video, the image frame may be one of a plurality of frames of the video.

In operation 220, the human body estimating apparatus may determine a 2D appearance parameter of the 2D human body by analyzing the image frame. The human body estimating apparatus may analyze the image frame using a convolutional neural network (CNN). The CNN may be trained in advance (e.g., pre-trained) to output the 2D appearance parameter corresponding to the input image frame, based on the input image frame. The 2D appearance parameter may include a 2D joint parameter and a 2D silhouette parameter. The 2D joint parameter may be denoted herein as J, and the 2D silhouette parameter may be denoted herein as S. The joint parameter may define a preset number of key points. The CNN may be trained to output the 2D joint parameter and the 2D silhouette parameter by extracting key points of the 2D human body and a silhouette of the 2D human body from a training image including the 2D human body.

In operation 230, the human body estimating apparatus may determine a 3D appearance parameter of the 2D human body based on the 2D appearance parameter, a camera parameter of the camera, and a 3D space parameter of the 2D human body. The camera parameter may include a camera model and/or an intrinsic parameter. The camera parameter may be denoted herein as K. The 3D space parameter may include a rotation parameter and a translation parameter that represent a relative relationship between the camera and the 2D human body. The rotation parameter and the translation parameter may be denoted herein as R and T, respectively. The rotation parameter and the translation parameter may be collectively denoted herein as a pose parameter.

The 3D appearance parameter may include a 3D joint parameter and a 3D shape parameter. The 3D joint parameter and the 3D shape parameter may be denoted herein as $\theta$ and $\beta$, respectively. The 3D appearance parameter may be restored to be in a 3D form of a human body through a 3D human body model. The 3D human body model may be a skinned multi-person linear (SMPL) model, for example.

A degree of matching between the restored 3D form and a real human body form may be related to information that is given to the 3D human body model. The human body estimating apparatus may provide the 2D appearance parameter, the camera parameter, and the 3D space parameter to the 3D human body model, and estimate the 3D appearance parameter based on the provided parameters. The camera parameter may be used to apply a characteristic of the camera that generates an input image to the estimation of the 3D appearance parameter. For example, based on which portion of a lens is used to capture an image of a human body, a lens distortion such as a barrel distortion and a pincushion distortion may be generated in the human body. Such lens distortion may be considered through the camera parameter. The 3D space parameter may be used to apply a relative spatial relationship between the camera and the 2D human body to the estimation of the 3D appearance parameter. For example, an image of a shape of a human body may be distorted based on an image capturing angle, and the size of the human body may be distorted based on an image capturing distance. Such a shape and/or size may be considered through the 3D space parameter.

The human body estimating apparatus may estimate the 3D appearance parameter through the following Equations 1, 2, and 3, for example. The human body estimating apparatus may determine a temporary 2D joint parameter $\hat{J}$ and a temporary 2D silhouette parameter $\hat{S}$ as represented by Equations 1 and 2 below, for example.

$$\hat{J}=K\{z_T\Pi(R\theta)+[x_T,y_T]\} \quad \text{Equation 1:}$$

$$\hat{S}=K\{z_T\Pi(RX(\theta,\beta))+[x_T,y_T]\} \quad \text{Equation 2:}$$

In Equations 1 and 2, K denotes a camera parameter. $x_T$, $y_T$, and $z_T$ denote, respectively, an x-axis component, a y-axis component, and a z-axis component of a translation parameter T. $\Pi$ denotes a projection function. R denotes a rotation parameter. $\beta$ and $\theta$ denote a candidate 3D shape parameter and a candidate 3D joint parameter, respectively. X denotes a 3D human body model (e.g., an SMPL model). Referring to Equations 1 and 2 above, the human body estimating apparatus may determine a temporary 2D appearance parameter ($\hat{J}$, $\hat{S}$) based on a candidate 3D appearance parameter ($\beta$, $\theta$), a camera parameter (K), and a 3D space parameter (R, T). For example, according to Equation 1, a 3D joint rotated based on a multiplication between $\theta$ and R may be projected to a 2D joint through $\Pi$. Subsequently, the 2D joint may be translated based on $x_T$, $y_T$, and $z_T$, and then K may be multiplied with a result of the translation to determine $\hat{J}$. According to Equation 2, a 3D appearance rotated based on a multiplication between R and a result of the 3D human body model based on $\theta$ and $\beta$ may be projected to a 2D silhouette through $\Pi$. Subsequently, the 2D silhouette may be translated based on $x_T$, $y_T$, and $z_T$, and then K may be multiplied with a result of the translation to determine $\hat{S}$.

The human body estimating apparatus may determine a final 3D joint parameter $\hat{\theta}$ and a final 3D shape parameter $\hat{\beta}$ through the following Equation 3, for example.

Equation 3:

$$[\hat{\theta},\hat{\beta}] = \min_{[\theta,\beta]} \sum_i \|J_i - \hat{J}_i\|_2^2 + \|S - \hat{S}\|_2^2$$

In Equation 3, J denotes a 2D joint parameter, and i denotes a component of a joint. S denotes a 2D silhouette parameter. J and S may represent the 2D appearance parameter of the 2D human body in the image frame that is estimated in operation 220. Referring to Equation 3 above, the human body estimating apparatus may determine, to be a final 3D appearance parameter ($\hat{\theta}$, $\hat{\beta}$), a candidate 3D appearance parameter ($\theta$, $\beta$) based on a difference between a temporary 2D appearance parameter ($\hat{J}$, $\hat{S}$) and a 2D appearance parameter (J, S). For example, the human body estimating apparatus may determine, to be the final 3D appearance parameter ($\hat{\theta}$, $\hat{\beta}$), the candidate 3D appearance parameter ($\theta$, $\beta$) (e.g., from among a plurality of candidate 3D appearance parameters) that minimizes the difference between the temporary 2D appearance parameter ($\hat{J}$, $\hat{S}$) and the 2D appearance parameter (J, S).

In operation 240, the human body estimating apparatus estimates a 3D human body corresponding to the 2D human body based on the 3D space parameter and the 3D appearance parameter. The 3D appearance parameter may be the final 3D appearance parameter ($\hat{\theta}$, $\hat{\beta}$) that is determined in operation 230. The human body estimating apparatus may apply the 3D space parameter to a 3D appearance. For example, the human body estimating apparatus may output a parameter that represents the 3D human body by applying the 3D space parameter to the 3D appearance parameter. Alternatively, the human body estimating apparatus may represent the 3D human body in an output image (e.g., an AR image) by determining the appearance of the 3D human body corresponding to the 2D human body by applying the 3D appearance parameter to the 3D human body model (e.g., an SMPL model) and then rotating and translating the 3D appearance based on the 3D space parameter.

Figure 3:
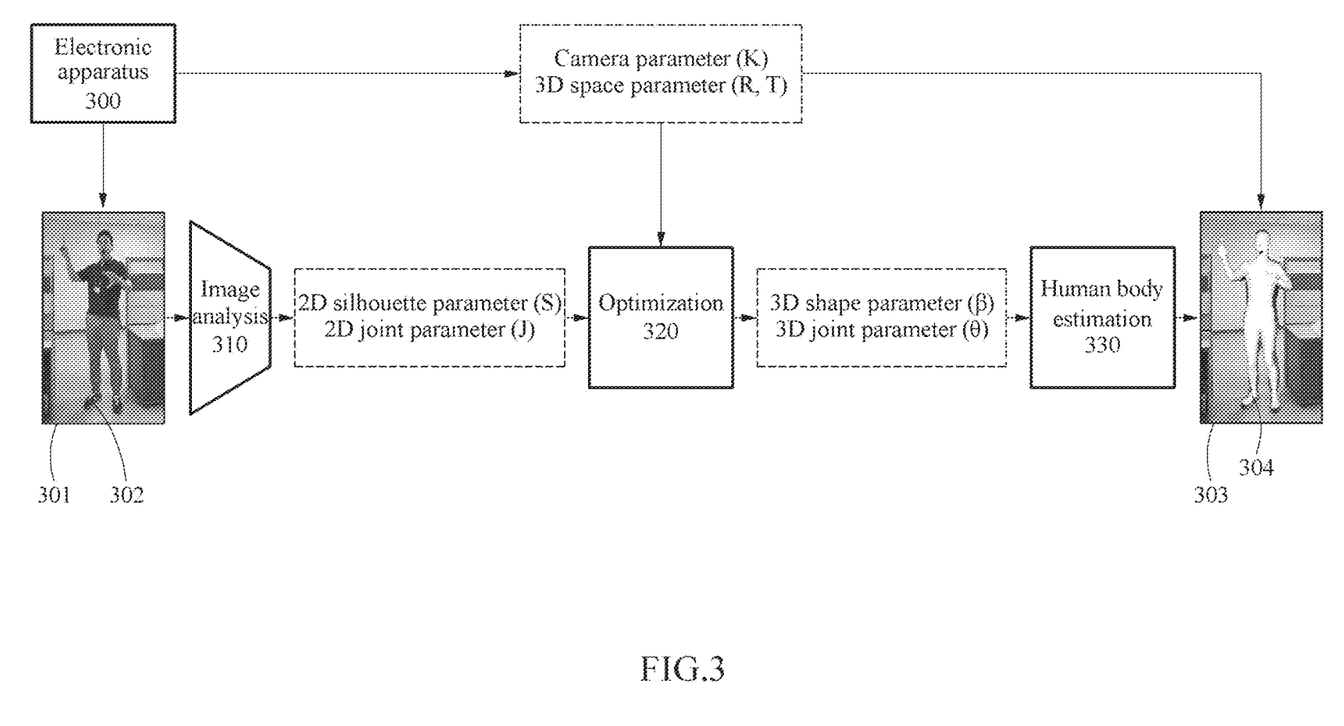
FIG. 3 illustrates an example of estimating a human body based on parameters.

FIG. 3 illustrates an example of estimating a human body based on parameters. Referring to FIG. 3, a human body estimating apparatus may obtain an image frame 301 from a camera of an electronic apparatus 300. The electronic apparatus 300 may be an AR device, for example. In a non-limiting example, the human body estimating apparatus is included in the electronic apparatus 300. In operation 310, the human body estimating apparatus performs image analysis on the image frame 301 to determine a 2D silhouette parameter S and a 2D joint parameter J that are associated with a 2D human body 302 in the image frame 301. For example, the human body estimating apparatus may determine the 2D silhouette parameter S and the 2D joint parameter J using a CNN.

The human body estimating apparatus may determine a camera parameter K of the camera and/or a 3D space parameter (R, T) based on parameter information received from the electronic apparatus 300. For example, the human body estimating apparatus may receive the camera parameter K from the electronic apparatus 300, or may know in advance the camera parameter K. The camera parameter K of the camera may be set at the same time when it is produced, and thus the human body estimating apparatus may receive the corresponding information from the electronic apparatus 300 or already know the information. In addition, the human body estimating apparatus may determine the 3D space parameter (R, T) through sensor data measured by a sensor of the electronic apparatus 300.

For example, in a case in which the electronic apparatus 300 is a first AR device and a person corresponding to the 2D human body 302 wears a second AR device, the human body estimating apparatus may determine a 3D space parameter (R, T) based on first simultaneous localization and mapping (SLAM) information of the first AR device and second SLAM information of the second AR device. For another example, in a case in which the electronic apparatus 300 is a first AR device and a person corresponding to the 2D human body 302 does not wear an AR device, the human body estimating apparatus may determine position information of an object corresponding to the 2D human body 302 based on a contact point between the object and a plane supporting the object, and determine a 3D space parameter (R, T) based on inertia information of the first AR device and the position information of the object. Non-limiting examples of the determining of the 3D space parameter (R, T) will be described below in greater detail with reference to FIGS. 4 and 5.

In operation 320, the human body estimating apparatus may perform optimization and may determine a 3D shape parameter β and a 3D joint parameter θ. For example, the human body estimating apparatus may perform optimization as represented above by Equations 1 through 3 based on the 2D silhouette parameter S, the 2D joint parameter J, the camera parameter K, and the 3D space parameter (R, T). Subsequently, in operation 330, the human body estimating apparatus may perform human body estimation.

The human body estimating apparatus estimates a 3D human body 304 corresponding to the 2D human body 302 based on the 3D space parameter (R, T) and the 3D appearance parameter (β, θ). For example, the human body estimating apparatus may output a parameter that represents the 3D human body 304 by applying the 3D space parameter (R, T) to the 3D appearance parameter β. Alternatively, the human body estimating apparatus may determine an appearance of the 3D human body 304 corresponding to the 2D human body 302 by applying the 3D appearance parameter β to a 3D human body model (e.g., an SMPL model), and then rotate and translate the determined 3D appearance through the 3D space parameter (R, T). The human body estimating apparatus may thereby represent the 3D human body 304 in an output image 303.

Figure 4:
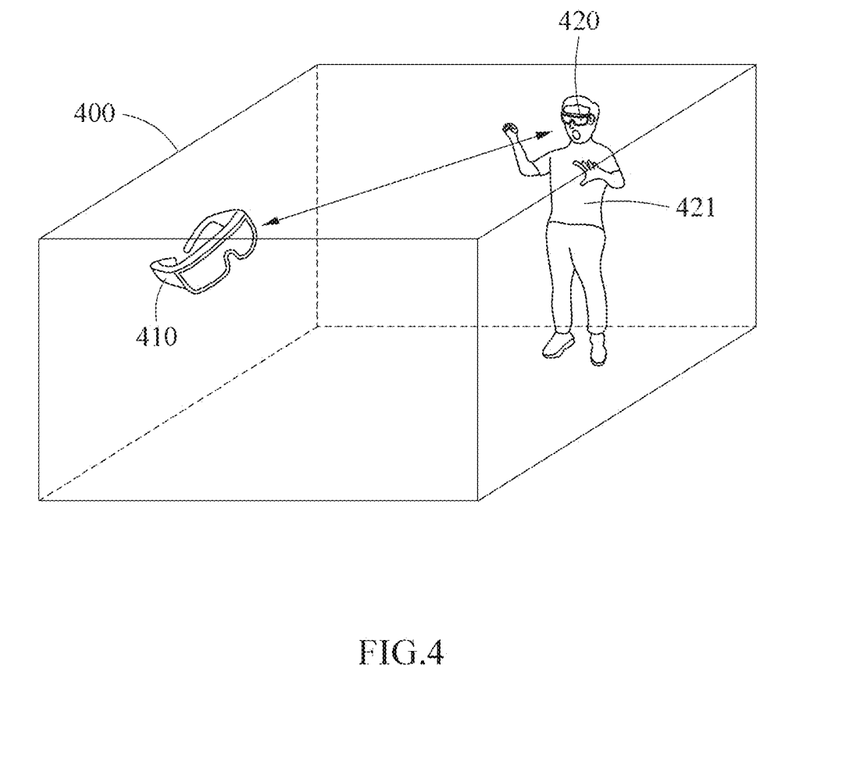
FIG. 4 illustrates an example of estimating a three-dimensional (3D) space parameter.

FIG. 4 illustrates an example of estimating a 3D space parameter. Referring to FIG. 4, a first AR device 410 may capture an image of a second user 421 wearing a second AR device 420 using a camera of the first AR device 410. Although not illustrated in FIG. 4, a user of the first AR device 410 may be referred to as a first user.

The first AR device 410 may estimate a 3D space parameter (R, T) based on first SLAM information of the first AR device 410 and second SLAM information of the second AR device 420. The 3D space parameter (R, T) may include a rotation parameter R and a translation parameter T. The 3D space parameter may represent a relative relationship between the first AR device 410 and the second AR device 420, or a relative relationship between the camera and/or the first user of the first AR device 410 and the second user 421.

The first AR device 410 and the second AR device 420 may determine the rotation information and the translation information of each through SLAM of each, and thus determine relative positions based on a position of each through map sharing for a 3D space 400. For example, the first AR device 410 and the second AR device 420 may derive shared map information by integrating map information of each other, determine a relative distance through a difference in the translation information, and determine a relative rotation through a difference in the rotation information. The first AR device 410 and the second AR device 420 may be connected (e.g., a wired or wireless connection) to each other for sharing the SLAM and/or map information. Although an AR device is described here as an example, other electronic devices in addition to the AR device may be used to estimate a 3D space parameter and/or a 3D human body.

Figure 5:
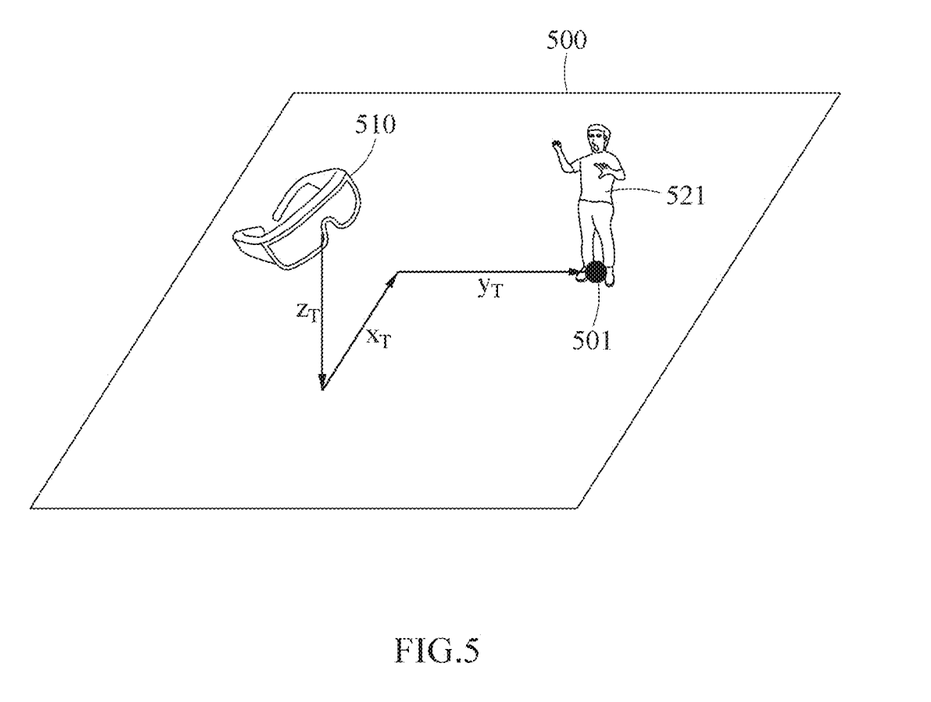
FIG. 5 illustrates another example of estimating a 3D space parameter.

FIG. 5 illustrates another example of estimating a 3D space parameter. Referring to FIG. 5, a first AR device 510 may capture an image of a second user 521 using a camera of the first AR device 510. Although not illustrated, a user of the first AR device 510 may be referred to as a first user. Unlike the example described above with reference to FIG. 4, the second user 521 may not wear a device (e.g., an AR device) for measuring information such as SLAM information. In this example, the first AR device 510 may estimate a 3D space parameter using plane detection.

For example, as illustrated, the first AR device 510 may detect a plane 500 that supports the second user 521 through the plane detection and may determine a contact point 501 between the plane 500 and the second user 521 to be position information of the second user 521. For example, the first AR device 510 may determine, to be the contact point 501, a point at which feet of the second user 521 cross or meet the plane 500. In this example, the first AR device 510 may determine a 3D space parameter based on inertia information of the first AR device 510 and the position information of the second user 521.

The 3D space parameter may include a rotation parameter R and a translation parameter T. The first AR device 510 may determine the inertia information of the first AR device 510 using an inertial measurement unit (IMU) sensor and determine the rotation parameter based on the inertia information. In addition, the first AR device 510 may determine the translation parameter (e.g., $x_T$, $y_T$, and $z_T$) based on a difference between a position of the first AR device 510 and a position of the second user 521.

The 3D space parameter may represent a relative relationship between the first AR device 510 and the second user 521, or a relative relationship between the camera and/or the first user of the first AR device 510 and the second user 521. Although an AR device is described here as an example, other electronic devices in addition to an AR device may be used to estimate a 3D space parameter and/or a 3D human body.

Figure 6:
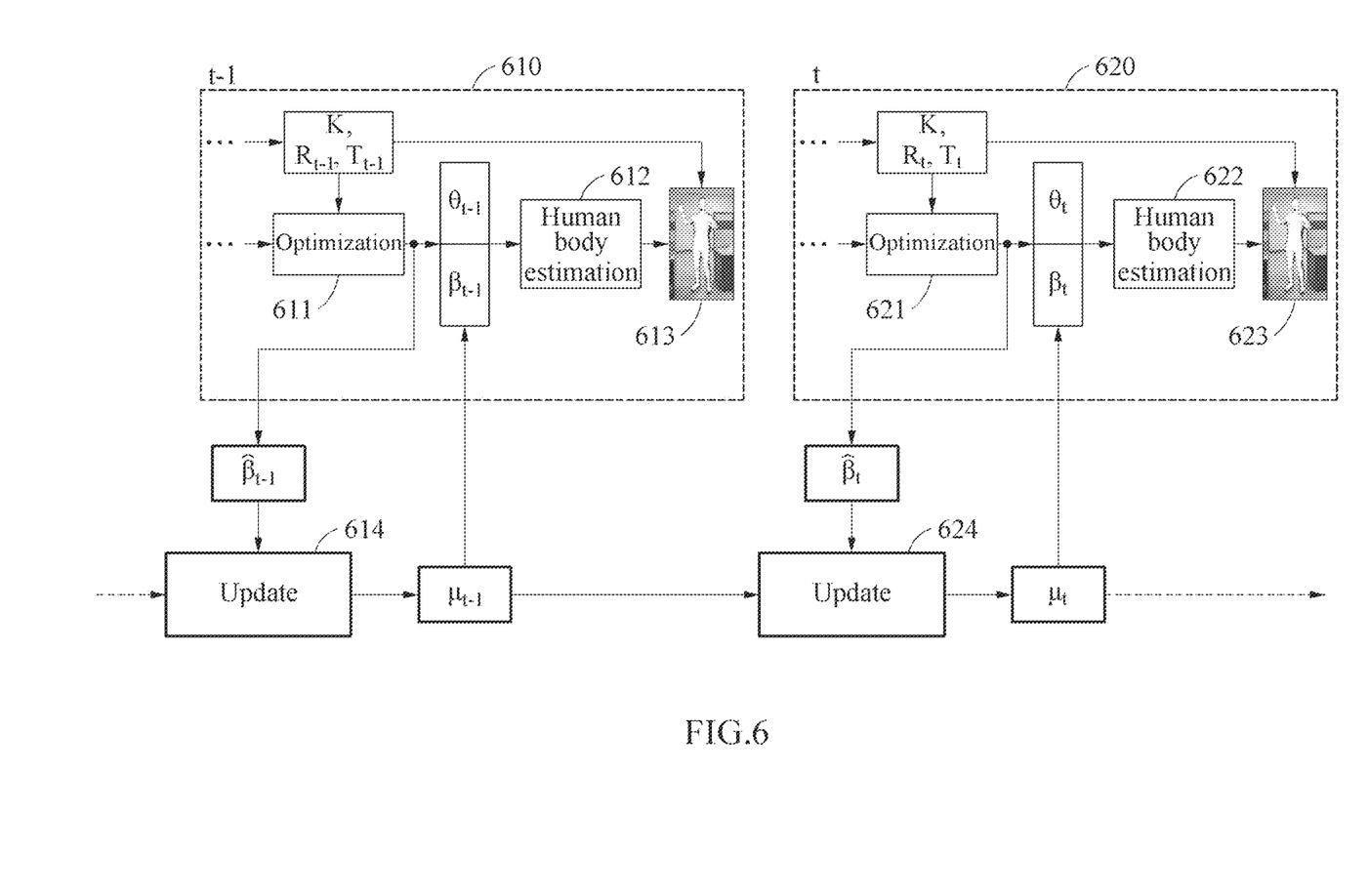
FIG. 6 illustrates an example of updating a 3D shape parameter.

FIG. 6 illustrates an example of updating a 3D shape parameter. A pose of a person may change based on a movement. However, the appearance (e.g., size, volume, etc.) of the person may not change in a short period of time. Based on such, a human body estimating apparatus may continuously update a 3D shape parameter with 3D shape information estimated through each frame. The human body estimating apparatus may derive a 3D shape parameter as represented by Equation 4 below, for example.

$$\beta_t = \mu_t = \frac{(t-1)\mu_{t-1} + \hat{\beta}_t}{t} \quad \text{Equation 4}$$

In Equation 4, $\mu_{t-1}$ denotes a previous average value of 3D shape parameters of previous image frames up to a previous time step t−1. $\hat{\beta}_t$ denotes a 3D shape parameter of a current image frame at a current time step t. A final 3D shape parameter of the current image frame is $\beta_t$, and thus $\hat{\beta}_t$ may also be referred to as a temporary 3D shape parameter. Through a weighted average of $\mu_{t-1}$ and $\hat{\beta}_t$, a current average value $\mu_t$ may be derived. The previous average value $\mu_{t-1}$ may reflect therein information of a greater number of frames. Thus, a weight that is based on the number of corresponding frames may be assigned to the previous average value $\mu_{t-1}$. The human body estimating apparatus may determine the current average value $\mu_t$ to be the 3D shape parameter $\beta_t$.

In the example of FIG. 6, illustrated are a previous human body estimating operation 610 for an image frame at a previous time step t−1, and a current human body estimating operation 620 for an image frame at a current time step t. The foregoing description of the human body estimation provided above with reference to FIG. 3 may be applicable to the previous human body estimating operation 610 and the current human body estimating operation 620. Equation 4 above may be used for update operations 614 and 624.

The previous human body estimating operation 610 may include an operation of deriving parameters (e.g., K, $R_{t-1}$, $T_{t-1}$) at the previous time step t−1, an optimization operation 611, and a human body estimation operation 612. Through the operations, a 3D human body 613 may be estimated. When a 3D joint parameter $\theta_{t-1}$ of a previous frame and a temporary 3D shape parameter $\hat{\beta}_{t-1}$ are derived through the optimization operation 611, a previous average value $\mu_{t-1}$ may be determined through the update operation 614 that is based on $\hat{\beta}_{t-1}$, and the previous average value $\mu_{t-1}$ may be determined to be a 3D shape parameter $\beta_{t-1}$ of the previous frame.

The current human body estimating operation 620 may include an operation of deriving parameters (e.g., K, $R_t$, $T_t$) at the current time step t, an optimization operation 621, and a human body estimation operation 622. Through the operations, a 3D human body 623 may be estimated. When a 3D joint parameter $\theta_t$ of a current frame and a temporary 3D shape parameter $\hat{\beta}_t$ are derived through the optimization operation 621, a current average value $\mu_t$ may be determined through the update operation 624 that is based on $\mu_{t-1}$ and $\hat{\beta}_t$, and the current average value $\mu_t$ may be determined to be a 3D shape parameter $\beta_t$ of the current frame.

Through such an update, it is possible to estimate a distribution of 3D shape parameters estimated by observing a human body corresponding to a target object in various views. When the number of updates increases, estimation with various views may be performed and an average therefrom may be closer to a real value, for example, ground truth. An average value of a shape parameter, which is a unique characteristic of an object, may converge on a certain value through continuous observation. Thus, such an update operation may be performed to improve accuracy by using an average value of shape parameters estimated from previous views and improve the accuracy of a position of a joint of a body as a result. Such an improvement of a shape parameter may improve the accuracy of the length of each body part (e.g., arms, legs, neck, waist, etc.) and improve the accuracy in estimation of a 3D joint through a 3D human body model (e.g., an SMPL model).

Figure 7:
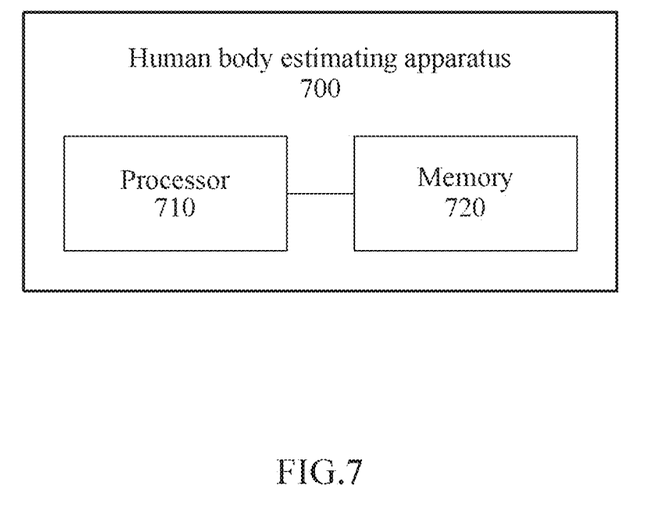
FIG. 7 illustrates an example of a human body estimating apparatus.

FIG. 7 illustrates an example of a human body estimating apparatus. Referring to FIG. 7, a human body estimating apparatus 700 may include a processor 710 (e.g., one or more processors) and a memory 720 (e.g., one or more memories). The memory 720 may be connected to the processor 710, and store instructions executable by the processor 710, data to be processed by the processor 710, or data processed by the processor 710. The memory 720 may be a non-transitory computer-readable medium, for example, a high-speed random-access memory (RAM) and/or nonvolatile computer-readable storage medium (e.g., one or more disc storage devices, flash memory devices, or other nonvolatile solid-state memory devices).

The processor 710 may execute instructions to perform one or more, or all, of the operations or methods described herein with reference to FIGS. 1 through 6 and 8. For example, the processor 710 may receive an image frame including a 2D human body from a camera, determine a 2D appearance parameter of the 2D human body by analyzing the image frame, determine a 3D appearance parameter of the 2D human body based on the 2D appearance parameter, a camera parameter of the camera, and a 3D space parameter of the 2D human body, and estimate a 3D human body corresponding to the 2D human body based on the 3D space parameter and the 3D appearance parameter. Also, what is described with reference to FIGS. 1 through 6 and 8 may be applicable to the detailed description of the human body estimating apparatus 700.

Figure 8:
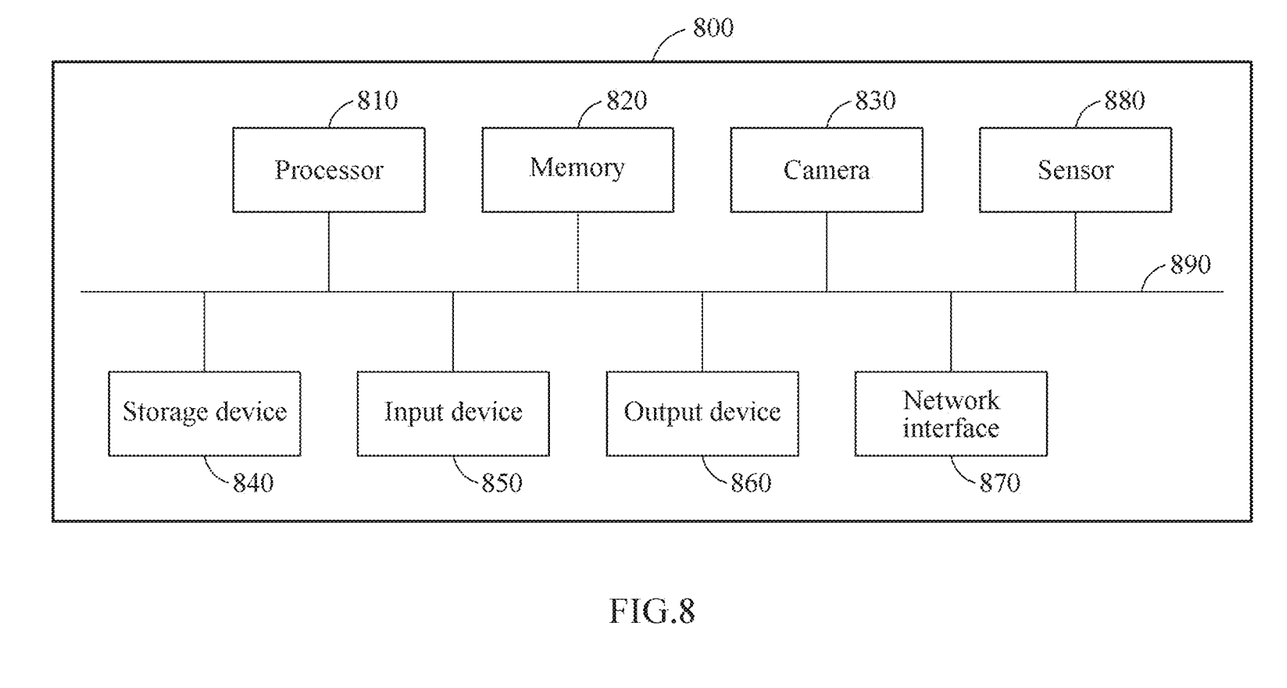
FIG. 8 illustrates an example of an electronic apparatus.

FIG. 8 illustrates an example of an electronic apparatus. Referring to FIG. 8, an electronic apparatus 800 includes a processor 810 (e.g., one or more processors), a memory 820 (e.g., one or more memories), a camera 830, a storage device 840, an input device 850, an output device 860, a network interface 870, and a sensor 880. These foregoing components may communicate with one another through a communication bus 890. For example, the electronic apparatus 800 may be embodied as a portion of a mobile device (e.g., a mobile phone, a smartphone, a personal digital assistant (PDA), a netbook, a tablet computer, a laptop computer, etc.), a wearable device (e.g., a smart watch, a smart band, smart glasses, etc.), a computing device (e.g., a desktop, a server, etc.), a home appliance (e.g., a television (TV), a smart TV, a refrigerator, etc.), a security device (e.g., a door lock, etc.), a vehicle (e.g., a smart vehicle, etc.), and other devices (e.g., an AR device, a virtual reality (VR) device, a drone, etc.), as non-limiting examples. The electronic apparatus 800 may structurally and/or functionally include the human body estimating apparatus 100 of FIG. 1 and/or the human body estimating apparatus 700 of FIG. 7.

The processor 810 may execute a function and instructions to be executed in the electronic apparatus 800. For example, the processor 810 may process instructions stored in the memory 820 or the storage device 840. The processor 810 may perform the operations and/or methods described above with reference to FIGS. 1 through 7. The memory 820 may include a computer-readable storage medium or a computer-readable storage device. The memory 820 may store instructions to be executed by the processor 810, and related information while software and/or an application is being executed by the electronic apparatus 800.

The camera 830 may capture an image, for example, a still image and/or a video. For example, the camera 830 may capture a 2D image including a 2D human body. The camera 830 may be a monocular camera that captures a monocular image, for example. The storage device 840 may include a computer-readable storage medium or a computer-readable storage device. The storage device 840 may store a greater amount of information than the memory 820, and store the information for a relatively long period of time. The storage device 840 may include, for example, a magnetic hard disk, an optical disc, a flash memory, a floppy disk, or a nonvolatile memory of another form that is known in the related technical field.

The input device 850 may receive an input from a user through a traditional input method using a keyboard and a mouse, or through a new input method using a touch input, a voice input, and an image input, as non-limiting examples. The input device 850 may include, for example, a keyboard, a mouse, a touchscreen, a microphone, or other devices that detect an input from a user and transfer the detected input to the electronic apparatus 800. The output device 860 may provide an output of the electronic apparatus 800 to a user through a visual, auditory, or tactile (or haptic) channel. The output device 860 may include, for example, a display, a touchscreen, a speaker, a vibration generating device, or other devices that provide an output to a user. The network interface 870 may communicate with an external device through a wired or wireless network. The sensor 880 may include various sensors such as an IMU, and generate SLAM information, inertia information, and the like through the sensors.

The human body estimating apparatuses, electronic apparatuses, processors, memories, cameras, storage devices, input devices, output devices, network interfaces, sensors, communication buses, human body estimating apparatus 100, electronic apparatus 300, human body estimating apparatus 700, processor 710, memory 720, electronic apparatus 800, processor 810, memory 820, camera 830, storage device 840, input device 850, output device 860, network interface 870, sensor 880, communication bus 890, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A human body estimating method comprising:
   receiving an image frame including a two-dimensional (2D) human body from a camera;
   determining a 2D appearance parameter of the 2D human body by analyzing the image frame;
   determining a three-dimensional (3D) appearance parameter of the 2D human body based on temporary 2D appearance parameters respectively projected based on candidate 3D appearance parameters determined based on the 2D appearance parameter, a camera parameter of the camera, and a 3D space parameter of the 2D human body; and
   estimating a 3D human body corresponding to the 2D human body based on the 3D space parameter and the 3D appearance parameter,
   wherein the estimating of the 3D appearance parameter comprises:
      determining a temporary 2D appearance parameter of the temporary 2D appearance parameters based on a candidate 3D appearance parameter of the candidate 3D appearance parameters, the camera parameter, and the 3D space parameter; and
      determining, to be the 3D appearance parameter, the candidate 3D appearance parameter that minimizes a difference between the temporary 2D appearance parameter and the 2D appearance parameter.

2. The method of claim 1, wherein the 2D appearance parameter includes a 2D joint parameter and a 2D silhouette parameter.

3. The method of claim 1, wherein the 3D space parameter includes either one or both of a rotation parameter and a translation parameter that represents a relative relationship between the camera and the 2D human body.

4. The method of claim 1, wherein the 3D space parameter is determined based on first simultaneous localization and mapping (SLAM) information of a first augmented reality (AR) device corresponding to the camera and on second SLAM information of a second AR device corresponding to the 2D human body.

5. The method of claim 1, wherein
   the 3D space parameter is determined based on inertia information of an augmented reality (AR) device corresponding to the camera and position information of a person corresponding to the 2D human body, and
   the position information of the person is determined based on a contact point between the person and a plane supporting the person.

6. The method of claim 1, wherein
   the candidate 3D appearance parameter includes a candidate 3D joint parameter and a candidate 3D shape parameter, and
   the determining of the temporary 2D appearance parameter comprises:
      determining a 2D joint parameter from a 3D joint corresponding to the candidate 3D joint parameter based on the camera parameter, the 3D space parameter, and a projection function;

determining a 2D silhouette parameter from a 3D appearance corresponding to the candidate 3D joint parameter and the candidate 3D shape parameter based on the camera parameter, the 3D space parameter, and the projection function; and determining the temporary 2D appearance parameter based on the 2D joint parameter and the 2D silhouette parameter.

7. The method of claim 1, wherein the 3D appearance parameter includes a 3D joint parameter and a 3D shape parameter.

8. The method of claim 7, wherein the determining of the 3D appearance parameter comprises:

determining a current average value based on a previous average value of 3D shape parameters of previous image frames and a 3D shape parameter of the image frame; and determining the current average value to be the 3D shape parameter.

9. The method of claim 1, wherein the determining of the 2D appearance parameter comprises:

analyzing the image frame using a pre-trained convolutional neural network (CNN).

10. The method of claim 1, wherein the estimating of the 3D human body comprises:

applying the 3D appearance parameter to a skinned multi-person linear (SMPL) model.

11. A non-transitory computer-readable storage medium storing instructions that, when executed by a processor, configure the processor to perform the method of claim 1.

12. The method of claim 1, wherein the 3D space parameter comprises:

a rotation parameter determined based on inertia information of a device including the camera; and a translation parameter determined based on a difference between a position of the device and a position of the 2D body.

13. A human body estimating apparatus comprising:

a processor configured to:

receive an image frame including a two-dimensional (2D) human body from a camera;

determine a 2D appearance parameter of the 2D human body by analyzing the image frame;

determine a three-dimensional (3D) appearance parameter of the 2D human body based on temporary 2D appearance parameters respectively projected based on candidate 3D appearance parameters determined based on the 2D appearance parameter, a camera parameter of the camera, and a 3D space parameter of the 2D human body; and estimate a 3D human body corresponding to the 2D human body based on the 3D space parameter and the 3D appearance parameter, wherein, for the estimating of the 3D appearance, the processor is configured to:

determine a temporary 2D appearance parameter of the temporary 2D appearance parameters based on a candidate 3D appearance parameter of the candidate 3D appearance parameters, the camera parameter, and the 3D space parameter; and determine, to be the 3D appearance parameter, the candidate 3D appearance parameter that minimizes a difference between the temporary 2D appearance parameter and the 2D appearance parameter.

14. The apparatus of claim 13, wherein the 2D appearance parameter includes a 2D joint parameter and a 2D silhouette parameter, the 3D space parameter includes either one or both of a rotation parameter and a translation parameter that represents a relative relationship between the camera and the 2D human body, and the 3D appearance parameter includes a 3D joint parameter and a 3D shape parameter.

15. The apparatus of claim 13, wherein the 3D appearance parameter includes a 3D joint parameter and a 3D shape parameter, and for the determining of the 3D appearance parameter, the processor is configured to:

determine a current average value based on a previous average value of 3D shape parameters of previous image frames and a 3D shape parameter of the image frame; and determine the current average value to be the 3D shape parameter.

16. The apparatus of claim 13, further comprising a memory storing instructions that, when executed by the processor, configure the processor to perform the receiving of the image frame, the determining of the 2D appearance parameter, the determining of the 3D appearance parameter, and the estimating of the 3D human body.

17. An electronic apparatus, comprising:

a camera configured to generate an image frame including a two-dimensional (2D) human body; and a processor configured to:

determine a 2D appearance parameter of the 2D human body by analyzing the image frame;

determine a three-dimensional (3D) appearance parameter of the 2D human body based on temporary 2D appearance parameters respectively projected based on candidate 3D appearance parameters determined based on the 2D appearance parameter, a camera parameter of the camera, and a 3D space parameter of the 2D human body; and estimate a 3D human body corresponding to the 2D human body based on the 3D space parameter and the 3D appearance parameter, wherein, for the estimating of the 3D appearance, the processor is configured to:

determine a temporary 2D appearance parameter of the temporary 2D appearance parameters based on a candidate 3D appearance parameter of the candidate 3D appearance parameters, the camera parameter, and the 3D space parameter; and determine, to be the 3D appearance parameter, the candidate 3D appearance parameter that minimizes a difference between the temporary 2D appearance parameter and the 2D appearance parameter.

18. The apparatus of claim 17, wherein the 2D appearance parameter includes a 2D joint parameter and a 2D silhouette parameter, the 3D space parameter includes either one or both of a rotation parameter and a translation parameter that represents a relative relationship between the camera and the 2D human body, and the 3D appearance parameter includes a 3D joint parameter and a 3D shape parameter.

19. The apparatus of claim 17, wherein the 3D appearance parameter includes a 3D joint parameter and a 3D shape parameter, and for the determining of the 3D appearance parameter, the processor is configured to:

determine a current average value based on a previous average value of 3D shape parameters of previous image frames and a 3D shape parameter of the image frame; and determine the current average value to be the 3D shape parameter.

20. A human body estimating method comprising:

determining a two-dimensional (2D) appearance parameter based on an image frame including a 2D body received from a camera;

determining temporary 2D appearance parameters based on respectively corresponding candidate three-dimensional (3D) appearance parameters;

determining a minimum difference among differences between the temporary 2D appearance parameters and the 2D appearance parameter;

determining, as a final 3D appearance parameter, one of the candidate 3D appearance parameters used to determine one of the temporary 2D appearance parameters corresponding to the minimum difference; and estimating a 3D body corresponding to the 2D body based on the final 3D appearance parameter.

21. The method of claim 20, wherein the determining of the temporary 2D appearance parameters comprises:

rotating the candidate 3D appearance parameters based on a 3D space parameter;

projecting results of the rotating based on a projection function; and translating results of the projecting based on the 3D space parameter.

22. The method of claim 20, further comprising outputting an output image including an overlap of the 3D body onto the image frame.

* * * * *